(12) United States Patent
Pignataro et al.

(10) Patent No.: US 11,917,015 B2
(45) Date of Patent: Feb. 27, 2024

(54) INFRASTRUCTURE AND POLICY ORCHESTRATION FOR SHARED WORKSPACES

(71) Applicant: Cisco Technology, Inc., San Jose, CA (US)

(72) Inventors: Carlos M. Pignataro, Cary, NC (US); Nagendra Kumar Nainar, Morrisville, NC (US); David John Zacks, Vancouver (CA); John Matthew Swartz, Lithia, FL (US); Akram Ismail Sheriff, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/667,890

(22) Filed: Feb. 9, 2022

(65) Prior Publication Data
US 2023/0254379 A1    Aug. 10, 2023

(51) Int. Cl.
*H04L 67/141* (2022.01)
*H04L 41/08* (2022.01)
(Continued)

(52) U.S. Cl.
CPC .......... *H04L 67/141* (2013.01); *G06Q 10/02* (2013.01); *G06Q 10/109* (2013.01); *H04L 41/08* (2013.01);
(Continued)

(58) Field of Classification Search
CPC ....... H04L 67/141; H04L 41/08; H04L 41/28; H04L 47/72; H04L 47/822; H04L 47/825; G06Q 10/02; G06Q 10/109
See application file for complete search history.

(56) References Cited

U.S. PATENT DOCUMENTS 11,310,295 B1 *  4/2022  Demmer .................. H04L 51/52
11,399,283 B2 *  7/2022  Anantha ............. H04L 63/0892
(Continued)

FOREIGN PATENT DOCUMENTS

WO      2020/247937 A1    12/2020

OTHER PUBLICATIONS

Wikipedia, "GeoJSON," https://en.wikipedia.org/wiki/GeoJSON, Jan. 2022, 8 pages.

*Primary Examiner* — Ramy M Osman
(74) *Attorney, Agent, or Firm* — Edell, Shapiro & Finnan, LLC

(57) ABSTRACT

Presented herein are techniques to facilitate infrastructure and policy orchestration in a shared workspace network environment. In one example, a method may include obtaining, by a service broker, a reservation request from a consumer network for a consumer, wherein the reservation request seeks a reservation to reserve, at least in part, at least one workspace device for the consumer for a workspace for a particular day and a particular time period; based on determining that the at least one workspace device is available, providing a response to the consumer network that includes a first indicator for identifying the reservation of the workspace and at least one second indicator identifying the at least one workspace device; and upon receiving a session request from the consumer network that includes the second indicator, establishing a management tunnel to interconnect the consumer network and the at least one workspace device via the service broker.

20 Claims, 9 Drawing Sheets

(51) Int. Cl.
*H04L 47/72* (2022.01)
*G06Q 10/02* (2012.01)
*H04L 47/70* (2022.01)
*H04L 41/28* (2022.01)
*G06Q 10/109* (2023.01)

(52) U.S. Cl.
CPC .............. *H04L 41/28* (2013.01); *H04L 47/72* (2013.01); *H04L 47/822* (2013.01); *H04L 47/825* (2013.01)

(56) References Cited

U.S. PATENT DOCUMENTS

| | | | | |
|---|---|---|---|---|
| 2004/0267623 A1* | 12/2004 | Vivadelli | ............... | G06Q 10/06 379/212.01 |
| 2005/0195844 A1* | 9/2005 | Takada | ................... | H04L 67/52 370/411 |
| 2006/0015376 A1* | 1/2006 | Sattler | .................. | G06Q 10/109 705/5 |
| 2015/0227854 A1* | 8/2015 | Boettner | ................ | G06Q 10/02 705/5 |
| 2017/0161649 A1* | 6/2017 | Charles | ................... | G06Q 10/02 |
| 2017/0255880 A1 | 9/2017 | Daher et al. | | |
| 2018/0242154 A1* | 8/2018 | Ballard | ............... | H04L 61/5061 |
| 2019/0012614 A1* | 1/2019 | Yamada | .................. | H04L 67/12 |
| 2019/0026659 A1* | 1/2019 | Yakubovich | ........... | G06Q 10/02 |
| 2019/0228350 A1 | 7/2019 | Klein et al. | | |
| 2019/0311303 A1* | 10/2019 | Kanteti | ............... | G06Q 10/1095 |
| 2020/0111036 A1 | 4/2020 | Gulas | | |
| 2020/0162917 A1* | 5/2020 | Anantha | ............... | H04L 63/108 |
| 2020/0216176 A1* | 7/2020 | Ma | ......................... | H04L 67/12 |
| 2020/0244592 A1* | 7/2020 | Fujimura | ............. | H04L 47/788 |
| 2020/0366682 A1* | 11/2020 | Aggarwal | ............ | H04L 63/105 |
| 2021/0295217 A1* | 9/2021 | Nagahara | .............. | G06F 16/904 |
| 2021/0392550 A1* | 12/2021 | Saito | ..................... | H04L 63/102 |
| 2022/0019472 A1* | 1/2022 | Norota | ................. | G06Q 10/109 |
| 2023/0144231 A1* | 5/2023 | Persson | .................. | G06Q 10/02 705/5 |
| 2023/0254379 A1* | 8/2023 | Pignataro | ............. | H04L 67/141 709/227 |

* cited by examiner

INFRASTRUCTURE AND POLICY ORCHESTRATION FOR SHARED WORKSPACES

TECHNICAL FIELD

The present disclosure relates to network equipment and services.

BACKGROUND

The mandatory "Work from Home" situation imposed by the recent pandemic has introduced new business opportunities related to remote working services. For example, the co-working space business model is a new office workspace business model in which multiple workers can share one or more workspaces within a facility. The shared workspace business model continues to evolve and create new revenue streams around the world. However, there challenges with managing such shared workspaces, particularly with regard to managing shared workspace networks, as well as managing devices connected to such networks.

DESCRIPTION OF EXAMPLE EMBODIMENTS

Overview

Figure 1:
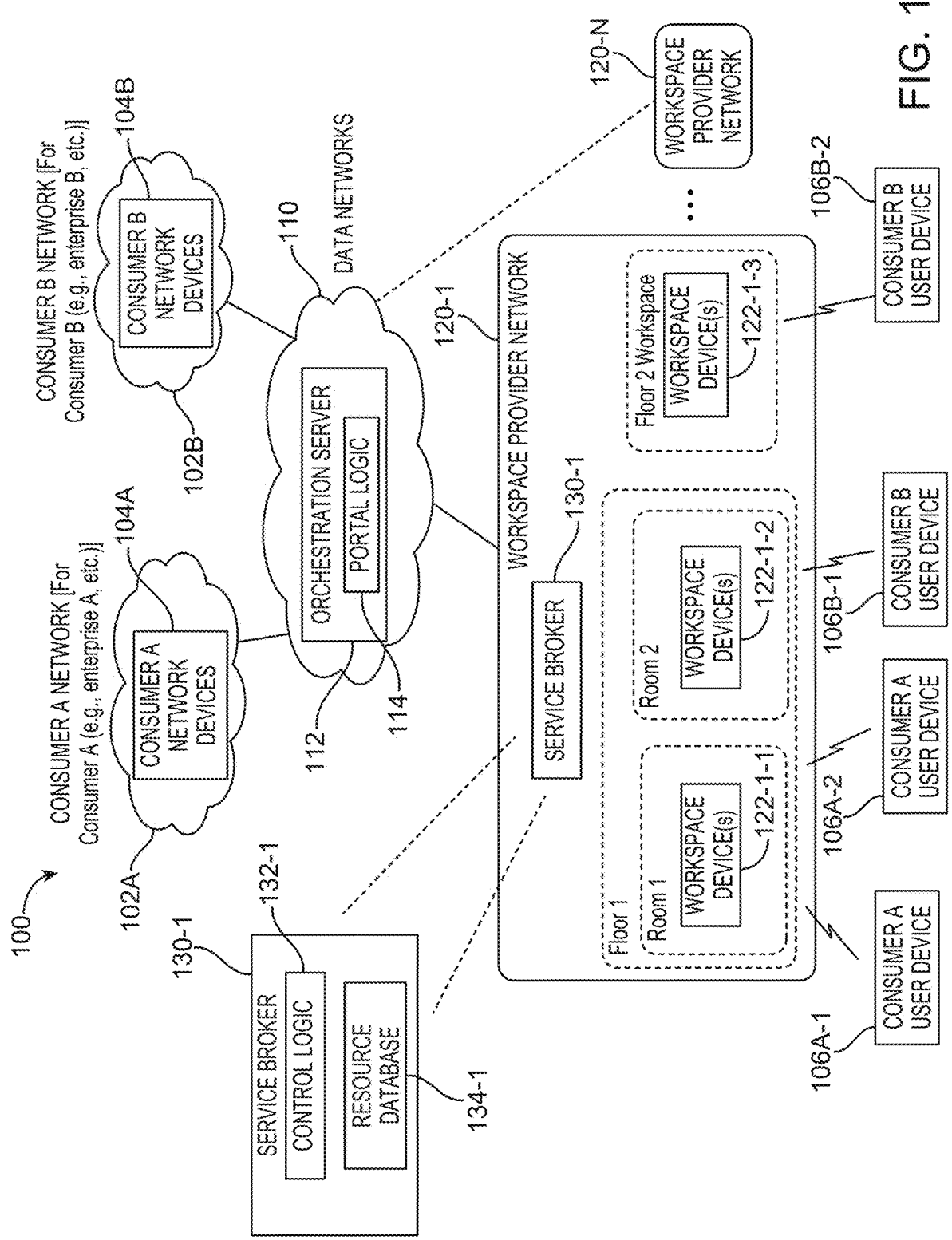
FIG. 1 is a block diagram of a system in which techniques may be implemented to facilitate infrastructure and policy orchestration in a shared workspace network environment, according to an example embodiment.

Presented herein are techniques to facilitate infrastructure and policy orchestration in a shared workspace network environment. Described herein are various systems through which one or more service contractor(s) or broker(s) may provide services and/or functionality that may reside within a given workspace/infrastructure provider network or within the cloud. When any consumer (e.g., employer) requests a workspace and network resources for any employee via a cloud orchestration server, a negotiation for the requested network resources may be performed between the orchestration server and the service broker through which the service broker may advertise available network resources (e.g., workspace devices and/or network services) that may be utilized for one or more workspace(s).

Upon determining a request from a given consumer network to establish a session for a reserved workspace, the service broker can facilitate the establishment of secured policy/management channels or tunnels to interconnect the consumer network (e.g., network device(s) of the consumer network) and internal network resources, such as workspace devices reserved for the workspace, in order to enable the consumer network to control or otherwise manage the network resources for the workspace during the period of time that the workspace is reserved by the consumer. The service broker may provide for the ability to push user- and/or consumer-centric policies and/or configurations to the network resources, and also ensure that the sessions are terminated once a reservation/user session expires.

In one embodiment, a method is provided that may include obtaining, by a service broker, a reservation request from a consumer network for a consumer, wherein the reservation request seeks a reservation to reserve, at least in part, at least one workspace device for the consumer for a workspace for a particular day and a particular time period, wherein the workspace and the at least one workspace device can be shared among multiple consumers; based on determining that the at least one workspace device is available for the particular day and the particular time period, providing a response to the consumer network that includes, at least in part, a first indicator for identifying the reservation of the workspace and at least one second indicator identifying the at least one workspace device; and upon receiving a session request from the consumer network that includes the second indicator, establishing a management tunnel to interconnect the consumer network and the at least one workspace device via the service broker to facilitate management of the at least one workspace device by the consumer network.

Example Embodiments

There are many shared workspace providers taking advantage of the new shared workspace business model. These providers typically offer pay-as-you-go (PAYG) services that are infrastructure-centric and lack seamless technology integration. For example, a common working space such as a meeting room or cube typically includes basic utilities such as a chair/desk, a video-camera, best effort Internet connectivity, etc. that any user can block or reserve and pay to use the space for a period of time, such as a day, week, month, etc.

While this new type of service allows the user to work remotely in a relatively secured manner, there are various challenges and opportunities that may be realized with current shared workspace offerings. For example, in one use-case, a banking employee may need to execute critical transactions that may involve continuous multi-factor authentication (MFA) services, which may not be limited only to the integrity user/employee integrity checks, but may also be used to ensure that transactions are executed when no other person is within a certain vicinity (e.g., within the same room, etc.). In another example, a shared workspace/infrastructure provider may provide collaboration endpoints that may be controlled by the provider, rather than an employer of an employee utilizing a shared workspace.

In order to address such issues and opportunities, techniques are described herein that can be utilized through which a service contractor or broker can be utilized to seamlessly create a policy/management channels to connect shared workspace infrastructure or network resources to corporate/enterprise controllers/devices within an enterprise network in order to push enterprise and/or user-centric configurations and/or policies to workspace devices on a Control-and-PAYG based approach.

Referring to FIG. 1, FIG. 1 is a block diagram of a system 100 in which techniques may be implemented to facilitate infrastructure and policy orchestration in a shared workspace network environment, according to an example embodiment. As shown in FIG. 1, system 100 may include a number workspace provider networks 120-1 to 120-N that may interface with data networks 110, which may further interface with consumer networks, including consumer A network 102A and consumer B network 102B.

Consumer A network 102A may include any number of network devices 104A and consumer B network 102B may also include any number of network devices 104B. In various embodiments, network devices 104A and 104B may be inclusive of any combination of provisioning servers/services (through which a given consumer can request a reservation for one or more workspace(s) and network resources for the workspace(s) to be utilized by consumer user devices and which may initiate a session for the consumer user devices), wireless local area network (LAN) controllers (WLCs) (e.g., for managing/configuring one or more wireless LAN (WLAN) access points), collaboration servers (e.g., video teleconference servers, holographic teleconference servers), call managers (e.g., for managing/configuring Internet Protocol (IP) phones), user databases, policy databases, combinations thereof, and/or the like.

Generally, consumer networks 102A and 102B may be associated with consumers, such as enterprises, businesses, employers, organizations, etc. that may employ or otherwise be associated with one or more users operating various user devices in which the consumers and/or the consumer users may seek to reserve one or more workspaces provided by a workspace provider, which is illustrated in FIG. 1 as workspace provider network 120-1.

User devices, such as consumer A user devices 106A-1 and 106A-2 and consumer B user devices 106B-1 and 106B-2, also sometimes referred to as user equipment (UEs), may be associated with any user, subscriber, employee, contractor, client, consumer, electronic device, etc. wishing to initiate a flow in a system (such as system 100 or system 100', discussed below) and may be inclusive of any device that initiates a communication in the system, such as a computer, an electronic device such as an industrial device (e.g., a robot), automation device, enterprise device, appliance, Internet of Things (IoT) device (e.g., sensor, monitor, etc.), a laptop or electronic notebook, a cellular and/or Wi-Fi® enabled telephone/smart phone, tablet, etc. and/or any other device, component, element, or object capable of initiating voice, audio, video, media, or data exchanges within a system. Thus, a user device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes/access points (APs) a radio access network (RAN) for one or more wireless communication sessions.

It is to be understood that consumer A network 102A, consumer B network 102B, data networks 110, and/or workspace provider network 120-1-120-N may be separate networks and/or may overlap in whole and/or in part in any manner in accordance with techniques described herein. Further, the various interfaces shown in FIG. 1 are provided for illustrative purposes only and are not meant to limit the broad scope of the present disclosure. It is to be understood that network connectivity/interfaces among any of the networks/elements/device/logic/etc. illustrated for FIG. 1 (and any other system illustrated herein), may be provided in any manner/configuration in order to facilitate operations as discussed for embodiments herein.

Data networks 110 may be inclusive of the Internet, cloud network, combination thereof, and/or the like and may include an orchestration server 112 including portal logic 114. Generally, portal logic 114 may operate to provide a graphical user interface (GUI) portal for orchestration server 112 through when a consumer (e.g., employer) may request a workspace and network resources to be utilized for the workspace for a period of time (e.g., a number of minutes, hour(s), day(s), etc.).

Workspace provider network 120-1 may include a service broker 130-1, which may include control logic 132-1 and a resource database 134-1 that enables the service broker to facilitate reservation, orchestration, etc. of infrastructure and network resources (e.g., workspace devices, services, etc.) provided via workspace provider network 120-1.

Workspace provider network 120-1 may be a network operated by a workspace provider for any workspace structure or premises provided by the workspace provider, such as building, facility, or the like that may include one or more workspaces across one or more floors of the workspace premises in which each of the workspaces may include one or more workspace device(s) interconnected with the service broker 130-1 and/or among other workspace devices for the workspace provider network 120-1 in which the workspace device(s) for a given shared workspace can be utilized by users associated with a given consumer for a reserved period of time. Thus, for the deployment paradigm illustrated for the embodiment of FIG. 1, it is assumed that service broker 130-1 is not logically co-located in the same network/cloud tenant as either of consumer A network 102A or consumer B network 102B. However, other service broker deployment paradigms can be envisioned, as discussed in further detail below.

For example, as shown in FIG. 1, workspace provider network 120-1 may include workspace device(s) 122-1-1 provided for a first room (Room 1) for a first floor (Floor 1) and workspace device(s) 122-1-2 provided for a second room (Room 2) for the first floor. In addition, workspace device(s) 122-1-3 may be provided for a second floor (Floor 2), in which the entirety of the second floor may be considered a workspace. Thus, as illustrated in FIG. 1, any delineation, separation, configuration, etc. of rooms, offices, cubes, floors, combination of floors, and/or any combination thereof may be considered a "workspace" within the scope of embodiments herein.

In various embodiments, network resources provided via workspace provider network 120-1 may include workspace devices provided for a given workspace (e.g., any of workspace device(s) 122-1-1, 122-1-2, and 122-1-3) and may include any combination of wireless local area network (WLAN) access points (APs) (e.g., Institute of Electrical and Electronics Engineers (IEEE) 802.11 (Wi-Fi) APs, 802.15.4 (Ultra-Wideband (UWB) APs, Bluetooth® APs, etc.)), collaboration devices (e.g., video teleconference monitors, projectors, smart whiteboards, cameras, Internet Protocol (IP) phones, etc.), computing devices (e.g., tablets, laptops, personal computers, etc.), security devices (e.g., cameras, card readers, etc.), and/or any other devices that may be utilized for one or more workspaces of workspace provider network 120-1.

In addition to and/or in lieu of workspace devices provided for one or more workspaces, workspace provider network 120-1 may also offer network resources, such as any combination of network services for one or more users utilizing one or more workspaces, such as authentication/security services (e.g., biometric authentication, MFA, etc.), software-defined cloud interconnect services (SDCI) that may allow for the creation of service level agreement (SLA)—aware connectivity between a given consumer network and consumer user devices and/or workspace devices (e.g., to ensure different levels of throughput, bandwidth, quality of service, etc.), monitoring services, edge hosting services (e.g., for hosting consumer applications/services via workspace provider network 120-1), and/or the like.

It is to be understood that the various examples of workspace devices and network services that may be provided via workspace provider network 120-1 are provided for illustrative purposes only and are not meant to limit the broad scope of embodiments herein. Virtually any workspace devices and network services may be provided via a given workspace provider network and, thus, are clearly within the scope of embodiments herein. Service broker 130-1, via resource database 134-1, may maintain a list of the different types of workspace devices and/or network services that may be offered/reserved for various workspaces of workspace provider network 120-1.

Broadly, one or more service contractor(s) or broker(s), such as service broker 130-1, can be considered as a service and/or functionality that may reside within a given workspace/infrastructure provider network, such as workspace provider network 120-1, etc., or within the cloud (e.g., within data networks 110), such that when any consumer (e.g., employer) requests a workspace and network resources for any employee (e.g., via a GUI portal provided via portal logic 114 of orchestration server 112), a negotiation for the requested network resources may be performed between the orchestration server and the service broker through which the service broker may advertise available network resources (e.g., workspace devices and/or network services) that may be utilized for one or more workspace(s).

Upon determining a request from a given consumer network to establish a session for a reserved workspace, the service broker can facilitate the establishment of secured policy/management channels or tunnels, referred to herein as 'management tunnels', to facilitate interconnection of the consumer network (e.g., network device(s) of the consumer network) and internal network resources, such as workspace devices reserved for the workspace, in order to enable the consumer network to control or otherwise manage the network resources for the workspace during the period of time that the workspace is reserved by the consumer. The service broker may provide for the ability to push user- and/or consumer-centric policies and/or configurations to the network resources via the management tunnels and also ensure that the sessions are terminated once a reservation/user session expires. In general, a secure management channel or tunnel may be any secure communication interface that can be established to interconnect two or more network elements.

As noted above, different service broker deployment paradigms can be envisioned for embodiments herein. Although in at least one embodiment, a service broker, such as service broker 130-1 may be provisioned within a given workspace provider network that is not logically co-located with, such as workspace provider network 120-1, other variations may exist regarding where a service broker may be provisioned for a deployment. For example, in one instance, a service broker may also be provisioned within the cloud for a cloud network in which the service broker may facilitate infrastructure and policy orchestration for shared workspaces across a plurality of workspace provider networks. In yet another instance, a service broker may be logically co-located in the same cloud network/cloud tenant as network devices for a given consumer, such as for a virtual private cloud (VPC) deployment.

Figure 2:
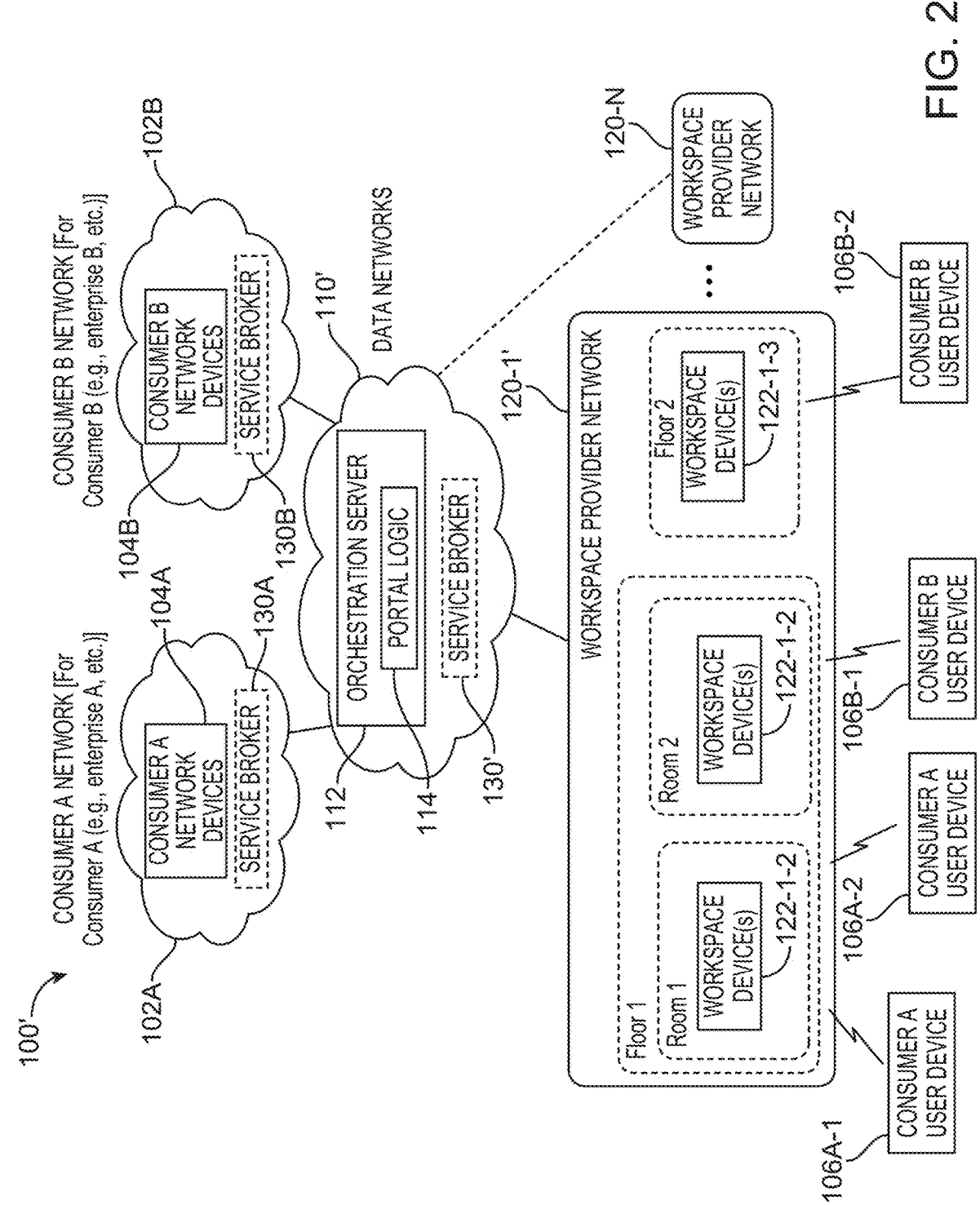
FIG. 2 is a block diagram of another system in which techniques may be implemented to facilitate infrastructure and policy orchestration in a shared workspace network environment, according to an example embodiment.

For example, FIG. 2 illustrates another system 100' in which techniques may be implemented to facilitate infrastructure and policy orchestration in a shared workspace network environment, according to various example embodiments. In at least one embodiment a service broker 130' may be provisioned within data networks 110' in order to facilitate the establishment of secured management tunnels to facilitate interconnection of one or more of consumer networks 102A and/or 102B and one or more workspace devices that may be reserved for one or more workspace(s) of workspace provider network 120-1. In such an embodiment, service broker 130' may also not be considered to be logically co-located with network devices of corresponding consumer networks.

In at least one other embodiment, consumer A network 102A may be deployed as a VPC/cloud tenant provided via a cloud network provider in which a service broker 130A may be provisioned such that it is considered to be logically co-located in the same cloud as network devices 104A. Similarly, consumer B network 102B may also be deployed as a VPC/cloud tenant via cloud network provider in which a service broker 130B may be provisioned such that it is considered to be logically co-located in the same cloud as network devices 104B.

It is to be understood that the various networks/elements/devices, etc. illustrated for the embodiment of FIG. 2, aside from those as discussed above with reference to service broker 130', service broker 130A, and/or service broker 130B, may be configured and/or operate in a similar manner as discussed above for FIG. 1.

Accordingly, and as discussed in further detail herein, below, embodiments herein may provide for the ability to seamlessly create management channels or tunnels in order to connect infrastructure resources to consumer network devices (e.g., corporate/cloud controllers, collaboration servers, etc.) in order to push, on-demand, user- and/or consumer-centric policies and/or configurations to network resources that may be utilized for a shared workspace during one or more periods of time (e.g., for one or more reservations) on a Control-and-PAYG-based approach.

Various advantages may be realized through embodiments discussed herein over conventional workspace offerings. For example, embodiments herein may advantageously provide for the ability to extend employer resources closer to employees, regardless of where the employees are located. Further, embodiments herein may remove the requirement of a user application to be installed on Wi-Fi clients/user devices or manual provisioning of Wi-Fi devices that may be utilized for hybrid work access environments in which devices may be used across shared workspaces and consumer/enterprise networks.

Still further, embodiments herein may advantageously enable dynamic policy derivation and time or session-based user-defined networking (UDN) attributes based on different resources that may be advertised by a service broker in which such dynamically derived policies/attributes could be provided for an additional security layer in order to remove further involvement of a user, contractor, etc. from having to revisit an application to deregister a Media Access Control (MAC) address from an access network. This may simplify the management aspect and/or improve user experience (UX) for shared workspace scenarios.

Consider various example operations that may be performed via the systems of FIG. 1 or FIG. 2 to facilitate infrastructure and policy orchestration in a shared workspace network environment, according to various example embodiments, as discussed in further detail with reference to FIG. 3, below.

Figure 3:
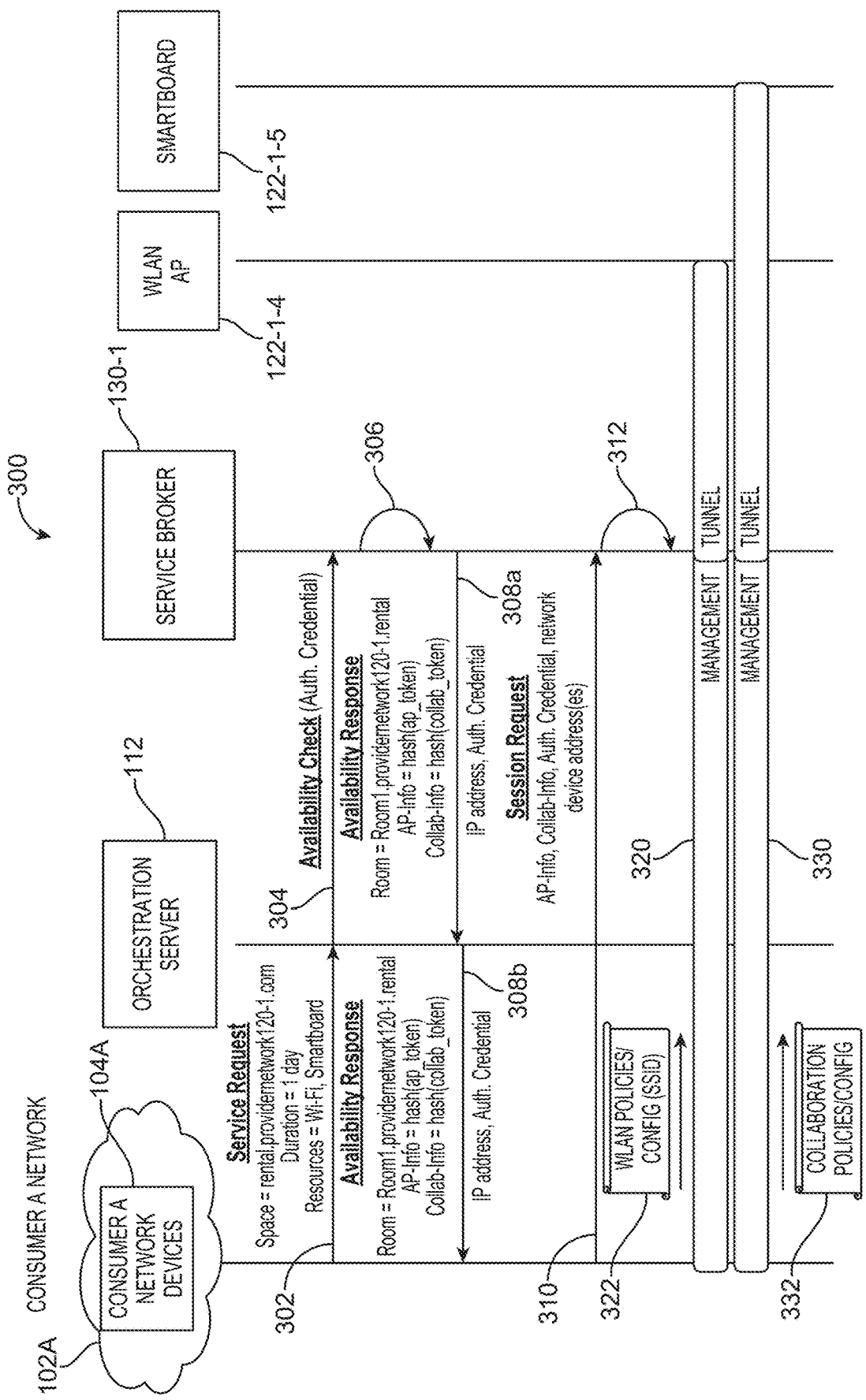
FIG. 3 is a message sequence diagram illustrating a call flow associated with infrastructure and policy orchestration operations that may be performed via the shared workspace network environment of FIG. 1, according to an example embodiment.

Referring to FIG. 3, FIG. 3 is a message sequence diagram illustrating a call flow 300 associated with infrastructure and policy orchestration operations that may be performed via the shared workspace network environment of FIG. 1, according to an example embodiment. FIG. 3 includes consumer A network 102A/network devices 104A, orchestration server 112, service broker 130-1, and various workspace devices, such as a WLAN AP 122-1-4 and a smartboard 122-1-5.

Broadly for FIG. 3, when a consumer, such as consumer A, via consumer A network 102A/network devices 104A, such as a provisioning server within the consumer A network 102A, requests a reservation for a workspace, the relevant services/workspace devices that are to be orchestrated for the workspace are requested from the workspace provider network 120-1 (not shown in FIG. 1), via a negotiation with service broker 130-1 through the portal GUI provided via orchestration server 112. Based on a result of the negotiation and availability of a workspace that is capable of providing the requested services/workspace devices and upon obtaining a request for a session for the workspace during the reserved period of time, respective management tunnel(s) will be established to interconnect the service broker 130-1, corresponding network devices 104A (such as a WLC for managing WLAN AP 122-1-4 and a collaboration server for managing smartboard 122-1-5), and the workspace devices reserved for the workspace, such as WLAN AP 122-1-4 and smartboard 122-1-5 in order for the network devices 104A to manage any user-centric and/or consumer-centric (e.g., employer-centric) policies/configuration of the workspace devices.

It is to be understood that WLAN AP 122-1-4 (and any other WLAN AP discussed herein) may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies in order to facilitate radio connections with one or more WLAN capable devices (e.g., user devices) for one or more wireless communication sessions. Generally, a smartboard, such as smartboard 122-1-5 may be any device that may facilitate electronic storing/generating of content that may be written on or otherwise displayed on the device. Thus, in some instances, smartboard devices can include camera systems, audio systems, etc. as well as any memory/storage, processor(s), logic, etc. that may facilitate capturing, storing (remotely and/or locally), and/or displaying content thereon.

As illustrated in FIG. 3, consider at 302 that consumer A, via consumer A network 102A/network devices 104A (e.g., the provisioning server for consumer A network 102A) initiates a service request toward the orchestration server 112 (via the GUI portal provided by the orchestration server) in order to seek/request a reservation to reserve a potential workspace (e.g., a workspace rental) for a workspace provided via the workspace premises associated with workspace provider network 120-1 (e.g., 'Space=rental.providernetwork120-1.com', which may be any indicator identifying the workspace premises), for a duration of 1 day (which include start time and end time information for the reservation duration), that provides network resources including Wi-Fi access and a smartboard. It is to be understood that the portal provided via orchestration server can indicate (e.g., via a GUI) different workspaces, network resources, durations, etc. that can be requested for reservation by the consumer for the service request. In some instances, a service request that seeks reservation of a workspace may include indications of mandatory and optional network resources requested for a given workspace (e.g., Wi-Fi=mandatory, smartboard=optional, etc.).

In some instances, particularly with reference to requested network resources including Wi-Fi access, a service request may include coordinates (e.g., latitude/longitude coordinates, Global Positioning System (GPS) coordinates, Geographic Javascript Object Notation (GeoJSON <x, y> coordinates, etc.) and/or any other indication that may represent the area that a given WLC of a consumer network may service. The coordinates/indication may facilitate workspace selection by the service broker for a workspace having a Wi-Fi AP within the service area of the WLC.

Upon receiving the service request, orchestration server 112 initiates a negotiation with service broker 130-1, as illustrated at 304, 306, and 308*a*/308*b*. In some instances, the orchestration server 112 may generate an authentication credential (e.g., token, key, etc.) that can be utilized by the service broker 130-1 for a subsequent session request that may be received from the consumer network 102A/network devices 104A to authenticate the session request and establish secure management tunnels for the workspace devices reserved for the workspace. Other authentication techniques can be envisioned and, as such, embodiments herein are not limited to use of an authentication credential generated by the orchestration server 112.

As illustrated at 304, orchestration server 112 initiates an availability check for an available workspace for the workspace premises associated with workspace provider network 120-1 (e.g., a room within an office building) and that may provide the requested network resources (e.g., workspace services/devices) via service broker 130-1 of workspace provider network 120-1. In one instance, the communication involving availability check may include the authentication credential for the consumer A network 102A/network devices 104A, as generated by the orchestration server 112. As shown at 306, the service broker 130-1, upon receiving the availability check stores the authentication credential and performs an availability check for the requested workspace and requested network resources.

It is to be understood that the availability check performed by service broker 130-1 at 306, via control logic 132-1 and resource database 134-1, may utilize any reservation, booking, management system/techniques/logic as would be understood by those skilled in the art for managing any list(s) of facilities, workspaces, resources, etc. for one or more period(s) of time in order to determine an availability of workspaces for one or more facilities, resources, etc. and reserve/associate workspaces at one or more workspace premises, resources, etc. with a given consumer for one or more period(s) of time.

Consider for the embodiment of FIG. 3 that a workspace, such as Room 1, and the requested network resources, WLAN AP 122-1-4 and smartboard 122-1-5, for the workspace premises associated with workspace provider network 120-1 are available for the requested duration (1-day, identified by a given start time and end time), for a given day/date. Thus, at 308*a*, service broker 130-1 advertises the available workspace and network resources to the consumer A network 102A/network devices 104A (e.g., provisioning server) via an availability response communicated to orchestration server 112, which forwards the availability response to the consumer A network 102A/network devices 104A, as shown at 308*b*. The availability response may provide an indicator of the first office that is reserved for the reserved duration (e.g., 'Room=Room1.providernetwork120-1.rental', which may be any indicator identifying the workspace (e.g., room) for the workspace premises associated with workspace provider network 120-1). The availability response may further provide indicators of the workspace devices that are reserved for the first office for the reservation duration (period of time=start time/end time). In one instance, the availability response may also provide the authentication credential as generated by the orchestration server 112 for the consumer A network 102A/network devices 104A.

It is to be understood that any consumer network/network devices upon requesting a reservation of a workspace for a certain period time will later capable of identifying the relevant service broker details provided for a given workspace provider network to initiate a session request toward the service broker in order to trigger the service broker to establish management tunnels with network devices of the consumer network. For example, in one instance, the service broker may provide an external IP address that identifies the service broker to the consumer network/network devices (e.g., a provisioning server of the consumer network) that successfully registered/reserved a given workspace/network resources. It is to be understood that other techniques may be utilized to facilitate identification of a given service broker for a given workspace provider network, such as configuration of service broker information at the orchestration server 112, advertising service broker information to orchestration server, etc. Accordingly, for the embodiment of FIG. 3, consider that service broker 130-1 advertises its IP address in the availability response sent at 308*a*.

Indicators of workspace device(s) reserved for a given workspace can take any form that may be utilized to appropriately identify such device(s) by a given service broker in order to identify the device(s) and establish management tunnels with the devices for a given reservation duration. For the embodiment of FIG. 3, consider that service broker 130-1 can generate an indicator for WLAN AP 122-1-4, which may be a hash of a token associated with the WLAN AP 122-1-4, such as 'AP-Info=hash(ap_token)'. The WLAN AP 122-1-4 indicator, 'AP-Info', may be tied to or otherwise correlated with an IP address of the WLAN AP 122-1-4, which can be stored by the service broker 130-1 in order to identify the appropriate WLAN AP 122-1-4. Service broker 130-1 can also generate an indicator for smartboard 122-1-5, which may be a hash of a token associated with smartboard 122-1-5, such as 'Collab-Info=hash(collab_token)'. Other indicators for collaboration device(s) reserved for a given workspace that may be generated by service broker 130-1 can be envisioned.

In some instances, multiple workspace devices may be available for a given workspace premise (e.g., multiple cameras within a large physical room, etc.). Thus, in some instances, indicator(s) of workspace device(s) reserved for a workspace may not identify a specific device, but rather may generally identify a workspace device type reserved for a particular consumer reservation. In such instances, when a user/user device associated with the particular consumer initiates a session request for the reservation at the particular workspace, the session request may include the GeoJSON <x, y> coordinates of the user service broker 130-1 may identify available workspace devices associated the consumer reservation within the workspace that are proximate to the user/user device in order to facilitate establishing corresponding management tunnels with such devices. Thus, in some instances, techniques herein may facilitate identifying and allocating network resources (via geo-coordinate based validation in a dynamic manner (e.g., upon obtaining a session request) in order to create a logical partition (e.g., geo-fence region) among workspace devices in the same physical layout by using the service broker based architecture along with the specific time duration information for utilizing such workspace devices. Further, techniques herein may facilitate provisioning different policies from the service broker for different workspace devices within different geo-fenced regions.

Returning the present example, as shown at 310, consider at the requested reservation start time, that consumer A network 102A, via a provisioning server, initiates a session request towards service broker 130-1 using the IP address for service broker 130-1 to configure management tunnels for the workspace devices reserved for the workspace (Room 1). The session request may include the indicators for the WLAP AP 122-1-4 (AP-Info) and the smartboard (Collab-Info), along with the authentication credential. It is to be understood that for instances in which one or more network services may be reserved for the reservation, that the session request may include other information, policies, etc. associated with the network services. The session request may also include IP address(es) of consumer A network devices 104A to enable the service broker 130-1 to establish management tunnels with corresponding network devices 104A that are to manage the workspace devices for the reserved workspace, such as WLC of consumer A network 102A that is to manage/configure policies for WLAN AP 122-1-4 and a collaboration server of consumer A network 102A that is to manage/configure policies for smartboard 122-1-5. Other information may be included in a session request, such as, for example, an indication of the time duration of a given reservation, one or more token(s) associated with/identifying a reservation request, service name information, the simple public IP address shared by the physical workspace provider with a consumer/consumer user that has registered for a workspace, combinations thereof, and/or the like.

As shown at 312, the service broker 130-1, upon receiving the request, will authenticate the inbound request by comparing the received authentication credential to the authentication credential stored for the consumer A network 102A, verify the available network resources (WLAN AP 122-1-4 and smartboard 122-1-5, and requested services, if applicable), and establish the relevant management tunnels to the relevant consumer A network devices 104A. Service broker 130-1 can also generate subsequent authentication credentials that can be used by the relevant consumer A network devices 104A, via service broker 130-1, to complete creation of the management tunnels to the reserved workspace devices. In one example in the case of multi-factor authentication (MFA), a service broker, upon receiving an incoming request can validate the credentials and generates temporary credentials as part of an MFA workflow via one-time password (OTP) messaging or other techniques (e.g., hardware generated OTP key, softkey, etc.) to establish the secured management tunnel(s) via the service broker to interconnect the relevant network device(s) with corresponding reserved workspace device(s).

In one example, as shown for the embodiment of FIG. 3, service broker 130-1 can establish a secure management tunnel 320 to interconnect a consumer A network device 104A, such as a WLC (not shown) of consumer A network 102A, and WLAN AP 122-1-4. The secure management tunnel 320 may provide for the ability to provision one or more WLAN policies/configurations 322 for the WLAN AP 122-1-4, such as configuring a consumer A Service Set Identifier (SSID) to be broadcast by the WLAN AP 122-1-4 that enables consumer A user devices, such as consumer A user devices 106A-1 and 106A-2 to seamlessly connect to the WLAN AP 122-1-4 for the reserved workspace, Room 1. In at least one embodiment, a secure management tunnel established to interconnect one or more WLAN AP(s) (or virtual WLAN AP(s)) and a consumer WLC may be provisioned as a Control and Provisioning of Wireless Access Points (CAPWAP) protocol tunnel. It is to be understood that any management/control of a WLAN AP/virtual AP may be provided via a secure management tunnel, such as, for example, providing client virtual LAN (VLAN) policies, providing (optional) client VLAN override policies, providing virtual AP instantiation policies, providing firewall and/or bridge rules (e.g., to provision a local switching mode for an AP, combinations thereof, and/or the like.

In another example, as shown for the embodiment of FIG. 3, service broker 130-1 can establish a secure management tunnel 330 to interconnect a consumer A network device 104A, such as a collaboration server (not shown) of consumer A network 102A, and smartboard 122-1-5. The secure management tunnel 330 may provide for the ability to provision one or more collaboration policies/configurations 332 for the smartboard 122-1-5, such as configuring a storage location within consumer A network 102A at which any notes, etc. written on the smartboard can be stored. In at least one embodiment, a secure management tunnel established to interconnect one or more collaboration device(s) and one or more collaboration server(s), call managers, etc. may be provisioned as an IP Security (IPSec) tunnel, or any variation thereof.

Although not illustrated in FIG. 3, in some instances service broker 130-1 can pull policies/configurations from one or more policy servers of consumer A network 102A in order to provision the policies/configurations for reserved workspace devices and/or network services reserved for the duration.

The portion of each management tunnel 320/330 established between service broker 130-1 and corresponding network devices 104A of consumer network 102A (e.g., a WLC for workspace device WLAN AP 122-1-4 and a collaboration server for workspace device smartboard 122-1-5) can carry management and control traffic in order to facilitate provisioning the workspace devices (e.g., policies, firewall rules, security, etc.) and controlling the workspace devices (e.g., reservation, allocation, etc.). Depending on the deployment paradigm for a given service broker, the portion of the management tunnels established between the service broker and corresponding workspace devices of a shared workspace may vary.

For example, for a deployment paradigm in which a service broker is deployed within a workspace provider network such that the service broker and consumer network devices are not logically co-located in the same cloud tenant (e.g., service broker 130-1), the portion of the management tunnels established between the service broker and the workspace devices would also carry management traffic and control traffic, whereas data traffic may be carried via data tunnels established between the workspace devices and the consumer network devices.

In another example for a deployment in which a service broker is deployed in a manner such that a service broker and consumer network devices are considered to be logically co-located in the same cloud tenant (e.g., service broker 130A and service broker 130B), the portion of the tunnels between the service broker and the workspace devices may carry both management/control traffic, as well as carry data traffic of the workspace devices in a dynamic manner in a common access network or a neutral host network (NHN) as may be provided via a workspace provider network.

Figure 4A:
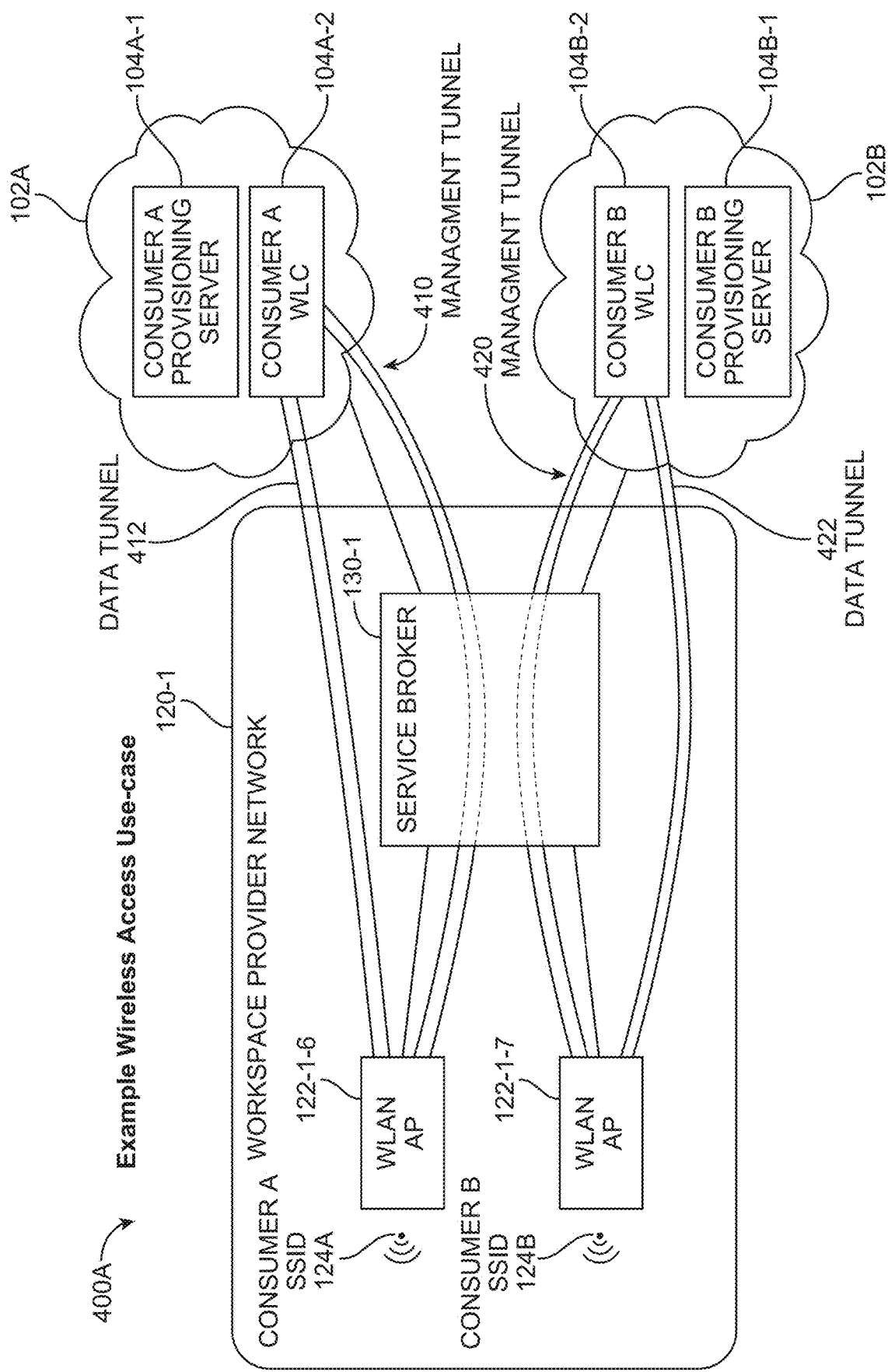
FIGS. 4A, 4B, 4C, and 4D are block diagrams illustrating example use-case implementations of the systems of FIG. 1 or FIG. 2 that may be utilized to facilitate infrastructure and policy orchestration in a shared workspace network environment, according to various example embodiments.

Various example use-case implementation details are illustrated via FIGS. 4A, 4B, 4C, and 4D. For example, consider a neutral wireless access use-case, as shown in FIG. 4A, which is a simplified block diagram illustrating an example wireless access use-case 400A including consumer A network 102A, consumer B network 102B, workspace provider network 120-1, service broker 130-1, and two workspace devices, such as a WLAN AP 122-1-6 and a WLAN AP 122-1-7. Consumer A network 102A may include network devices, such as a provisioning server 104A-1 and a WLC 104A-2, and consumer B network 102B may include network devices, such as a provisioning server 104B-1 and a WLC 104B-2.

For the embodiment of FIG. 4A, one of the services hosted by service broker 130-1 of workspace provider network 120-1 may be a WLC broker service in which the service broker 130-1 (e.g., upon obtaining a session request from provisioning server 104A-1) can establish a secure management tunnel 410 to interconnect consumer A WLC 104A-2 and WLAN AP 122-1-6 for management/configuration of the WLAN AP 122-1-6 by consumer A WLC 104A-2 for the duration of a reservation involving a reserved workspace and the WLAN AP. For example, consumer A WLC 104A-2 can provision a consumer A SSID 124A to be broadcast by WLAN AP 122-1-4. During or following the configuration, a data tunnel 412 can be established directly between consumer A WLC 104A-2 and WLAN AP 122-1-6 to facilitate the exchange of data packets for one or more user devices that may be utilizing the reserved workspace.

Similarly, the service broker 130-1 (e.g., upon obtaining a session request from provisioning server 104B-1) can establish a secure management tunnel 420 to interconnect consumer B WLC 104B-2 and WLAN AP 122-1-7 for management/configuration of the WLAN AP 122-1-7 by consumer B WLC 104B-2 for the duration of a reservation involving a reserved workspace and the WLAN AP. For example, consumer B WLC 104B-2 can provision a consumer B SSID 124B to be broadcast by WLAN AP 122-1-7. During or following the configuration, a data tunnel 422 can be established directly between consumer A WLC 104B-2 and WLAN AP 122-1-7 to facilitate the exchange of data packets for one or more user devices that may be utilizing the reserved workspace.

The WLC broker service provided via service broker 130-1 will establish the management tunnels 410/420 to connect various (one or more) access points in the workspace provider premises to the respective consumer WLCs 104A-2 and 104B-2 only for the period of time scheduled for each of consumer A and consumer B.

Consider, for example, an instance in which a few consumer A employees the Room 1 office space on Floor 1 of the workspace premise associated with workspace provider network 120-1 for a period of time T1, while consumer B reserved office spaces on Floor 2 for the period of time T1.

In this example, the APs in Floor 1, such as WLAN AP 122-1-6, will be connected to/managed by the consumer A WLC 104A-2 while the APs in Floor 2, such as WLAN AP 122-1-7, will be connected to/managed by the consumer B WLC 104B-2. The configured APs will exhibit the relevant SSID and may be configured to obtain consumer/user-centric policies, as desired. Once the scheduled time is over, the service broker 130-1 will clear the management session/remove the management tunnel 410 for the consumer A WLC 104A-2 for the WLAN AP 122-1-6 and also clear the management session/remove the management tunnel 420 for the consumer B WLC 104B-2 for the WLAN AP 122-1-7 and reset the configurations of the WLAN APs.

For cases in which multiple spaces may be covered by same WLAN AP, techniques herein can leverage either use a shared approach or can leverage shared compute resources for an AP to host a virtual AP and share radio resources. In the shared-use approach, consider that a WLAN AP can support a maximum of 16 SSIDs and can utilize virtualized routing and forwarding (VRF) logic for segmentation, in order to establish communications with different WLCs. Thus, in the shared-use approach, SSIDs for a given WLAN AP can be divided among different consumers and VRF logic can facilitate management/data tunnel communications for the WLAN AP.

Figure 4B:
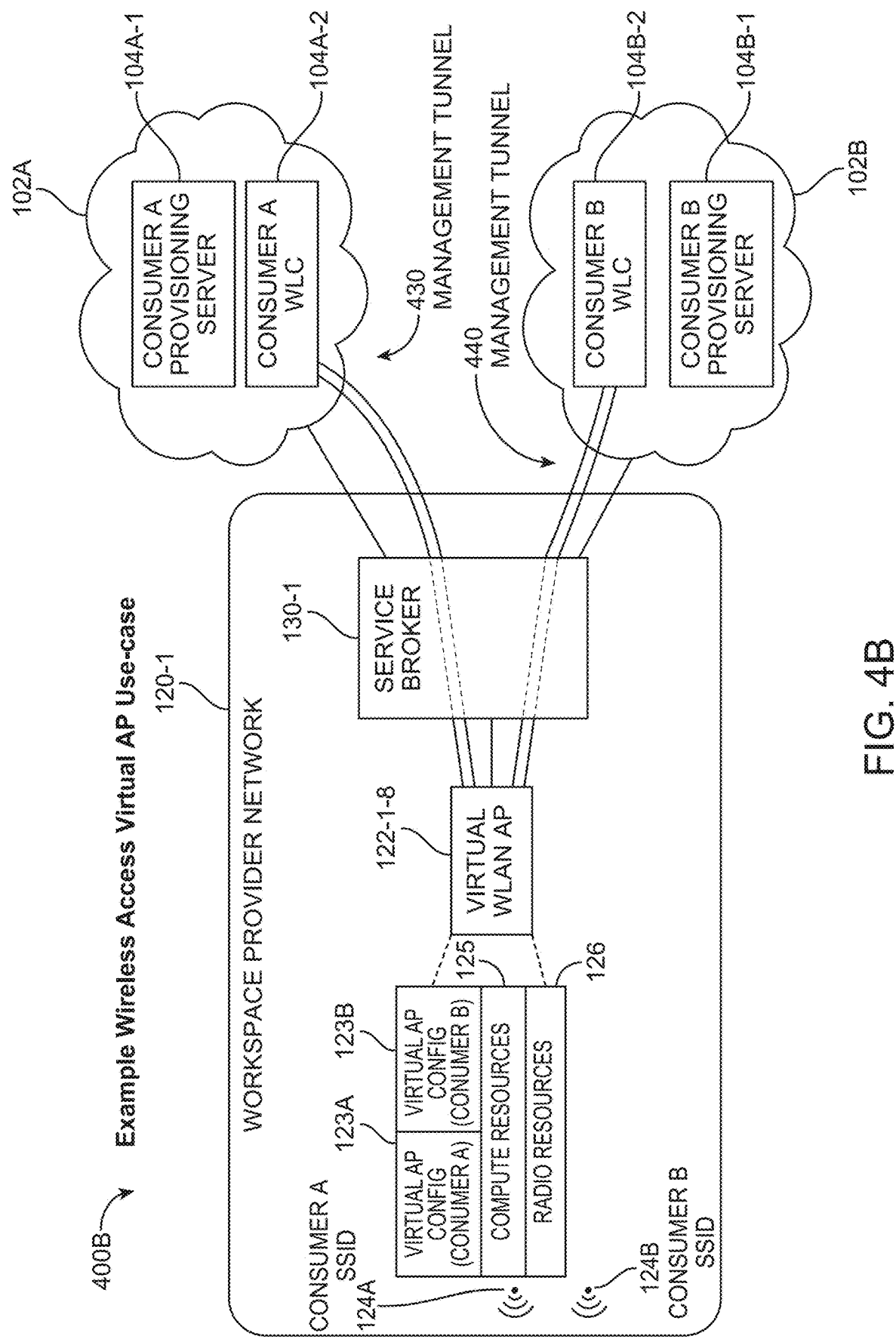

Regarding the virtual AP use-case, consider FIG. 4B, which is a simplified block diagram illustrating an example wireless access virtual AP use-case 400B including consumer A network 102A, consumer B network 102B, workspace provider network 120-1, service broker 130-1, and a workspace device, such as a virtual WLAN AP 122-1-8. Consumer A network 102A may include network devices, such as provisioning server 104A-1 and WLC 104A-2, and consumer B network 102B may include network devices, such as provisioning server 104B-1 and WLC 104B-2.

The virtual WLAN AP 122-1-8 may include compute resources 125 (e.g., memory/storage, processor(s), logic, etc.) and radio resources 126 (e.g., baseband processors (modems), transmitters and receivers, transceivers, antenna assemblies, etc.) to facilitate radio connections with one or more WLAN capable devices, such as user devices as discussed for various examples herein.

During operation, the service broker 130-1 (e.g., upon obtaining a session request from provisioning server 104A-1) can establish a secure management tunnel 430 to interconnect consumer A WLC 104A-2 and virtual WLAN AP 122-1-8 for management/configuration of the virtual WLAN AP 122-1-8 by consumer A WLC 104A-2 for the duration of a reservation involving a reserved workspace and the virtual WLAN AP 122-1-8. For example, consumer A WLC 104A-2 can provision a virtual AP configuration 123A for the virtual WLAN AP 122-1-8 to broadcast the consumer A SSID 124A by virtual WLAN AP 122-1-8 for the duration of a given reservation. Similarly, the service broker 130-1 (e.g., upon obtaining a session request from provisioning server 104B-1) can establish a secure management tunnel 440 to interconnect consumer B WLC 104B-2 and virtual WLAN AP 122-1-8 for management/configuration of the virtual WLAN AP 122-1-8 by consumer B WLC 104B-2 for the duration of a reservation involving a reserved workspace and the virtual WLAN AP 122-1-8. For example, consumer B WLC 104A-2 can provision a virtual AP configuration 123B for the virtual WLAN AP 122-1-8 to broadcast the consumer B SSID 124B by virtual WLAN AP 122-1-6 for the duration of a given reservation. It is to be understood that data tunnels can also be established via each WLC, as above discussed for FIG. 4A, but are not illustrated for FIG. 4B for purposes of brevity only.

Figure 4C:
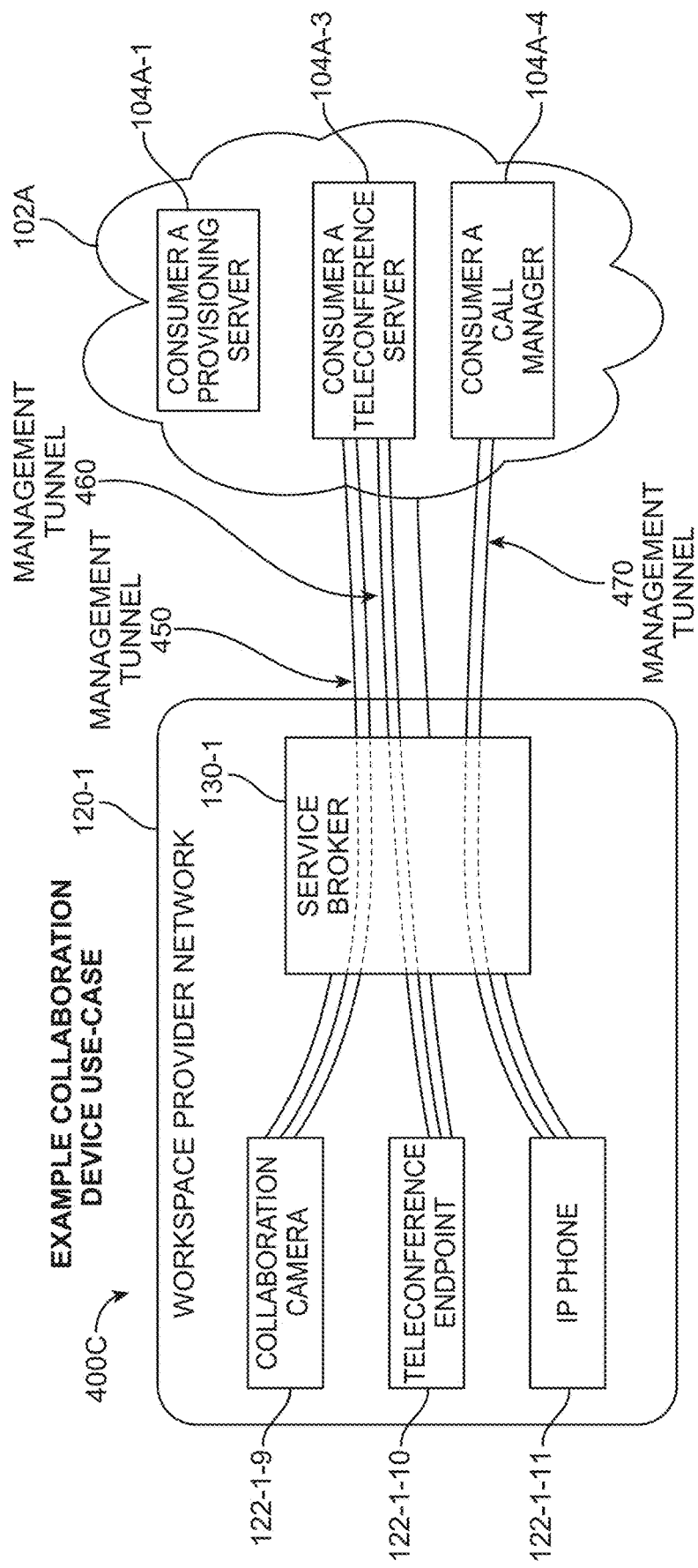

Beyond WLAN APs, consider an example use-case involving neutral collaboration endpoints with reference to FIG. 4C, which is a simplified block diagram illustrating an example collaboration device use-case 400C including consumer A network 102A, workspace provider network 120-1, service broker 130-1, and three workspace collaboration devices, such as a collaboration camera 122-1-9, a teleconference endpoint 122-1-10, and an IP phone 122-1-11. Consumer A network 102A may include network devices, such as provisioning server 104A-1, a teleconference server 104A-3, and a call manager 104A-4.

For the embodiment of FIG. 4C, one of the services hosted by service broker 130-1 of workspace provider network 120-1 may be a collaboration broker service. During operation, depending on the type of the network resources to be utilized for one or more workspaces, one or more management tunnels may be established to a corresponding network device that is to manage a given type of workspace device.

For example, collaboration devices such collaboration camera 122-1-9 and teleconference endpoint 122-1-10 may need to establish management sessions with teleconference server 104A-3, while IP phone 122-1-11 may need to establish a management session with call manager 104A-4. Thus, as shown in FIG. 4C, a management tunnel 450 can be established via service broker 130-1 to interconnect collaboration camera 122-1-9 and teleconference server 104A-3 and a management tunnel 460 can be established via service broker 130-1 to also interconnect teleconference endpoint 122-1-10 and teleconference server 104A-3. Further, a management tunnel 470 can be established via service broker 130-1 to interconnect IP phone 122-1-11 and call manager 140A-4.

In some instances, the type of endpoint may not always be compatible with a given consumer network device. For example, any Session Initiation Protocol (SIP) phone registering to call manager 104A-4 may need to identify its model number and pull a corresponding load file, etc. in order to be operational. In some embodiments, a cloud service, such as may be provided via orchestration server 112/service broker 130' (as shown in FIG. 2) may be offered in order to load the relevant boot/load files to corresponding workspace devices during initial registration for a given session.

Although the embodiments of FIGS. 4A, 4B, and 4C illustrate use-cases involving WLAN APs and collaboration devices separately, it is to be understood that any combination of workspace devices may be utilized together in accordance with embodiments herein.

Figure 4D:
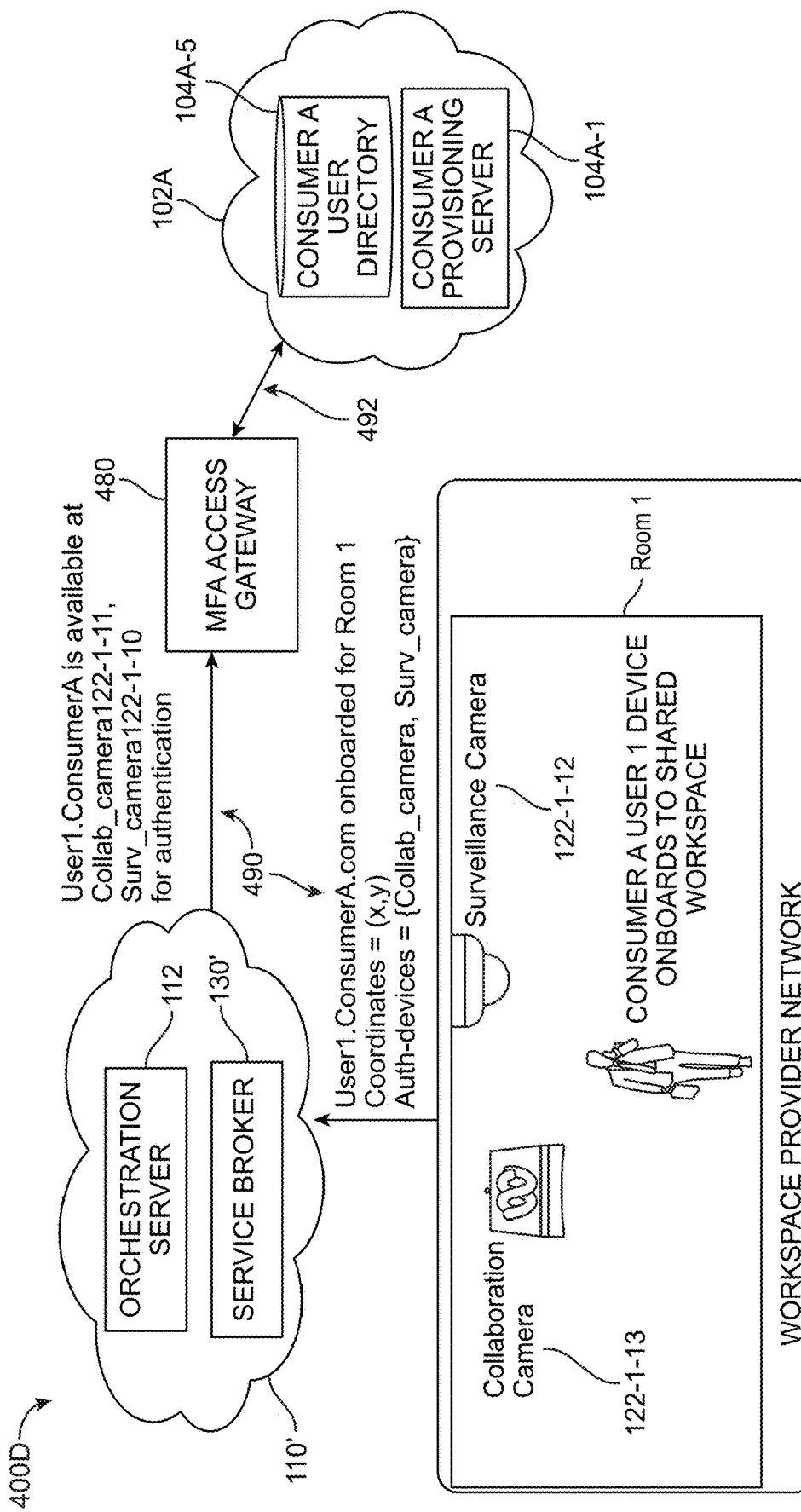

Turning to FIG. 4D, FIG. 4D is a simplified block diagram illustrating an example shared resource-based MFA use-case 400D for an embodiment involving cloud-based service broker 130' (as shown in FIG. 2). FIG. 4D includes consumer A network 102A, workspace provider network 120-1', data networks 110' including orchestration server 112 and service broker 130', and two workspace devices for a given workspace, such as a smart surveillance camera 122-1-12 and a collaboration camera 122-1-13. Also shown in FIG. 4D is an MFA access gateway 480, which may interface both with data networks 110' and consumer A network 102A. MFA access gateway 480 can be included in data networks 110' in some embodiments. Consumer A network 102A may include network devices, such as provisioning server 104A-1 and a user directory 104A-5 that may store biometric authentication information for various consumer A users.

For FIG. 4D, when any consumer A user schedules the workspace, the available resources in the workspace, such as surveillance camera 122-1-12 and collaboration camera 122-1-13 can be registered with MFA access gateway 480 and used for biometric-based multi-factor authentication. For example, as shown in FIG. 4D at 490, a consumer A user (User 1) is registered to the workspace including both surveillance camera 122-1-12 and collaboration camera 122-1-13 such that during onboarding/session establishment the devices will be registered with the MFA access gateway 480, which can utilize biometric information captured for the user (e.g., facial features, etc.) for biometric-based multi-factor authentication via consumer A user directory 104A-5, as generally shown at 492.

In some instances, when multiple collaboration camera(s) and/or other workspace devices are available in the same room (physical layout), then depending on the GeoJSON coordinates <x,y> from an incoming client session request to the service broker, the service broker could identify the closest possible device present in a geo-fenced region (for logical separation) of the same physical workspace, such as collaboration camera 122-1-11 and surveillance camera 122-1-10, in this example, and then provision the device with corresponding resources and apply the policies to the device. Such an embodiment may be useful in hybrid work/remote work scenarios.

Thus, in some instances, techniques herein may facilitate identifying and allocating network resources (via geo-coordinate based validation in a dynamic manner (e.g., upon obtaining a session request) in order to create a logic partition (e.g., geo-fence region) among workspace devices in the same physical layout by using the service broker based architecture along with the specific time duration information for utilizing such workspace devices. Further, techniques herein may facilitate provisioning different policies from the service broker for different workspace devices within different geo-fenced regions.

Figure 5:
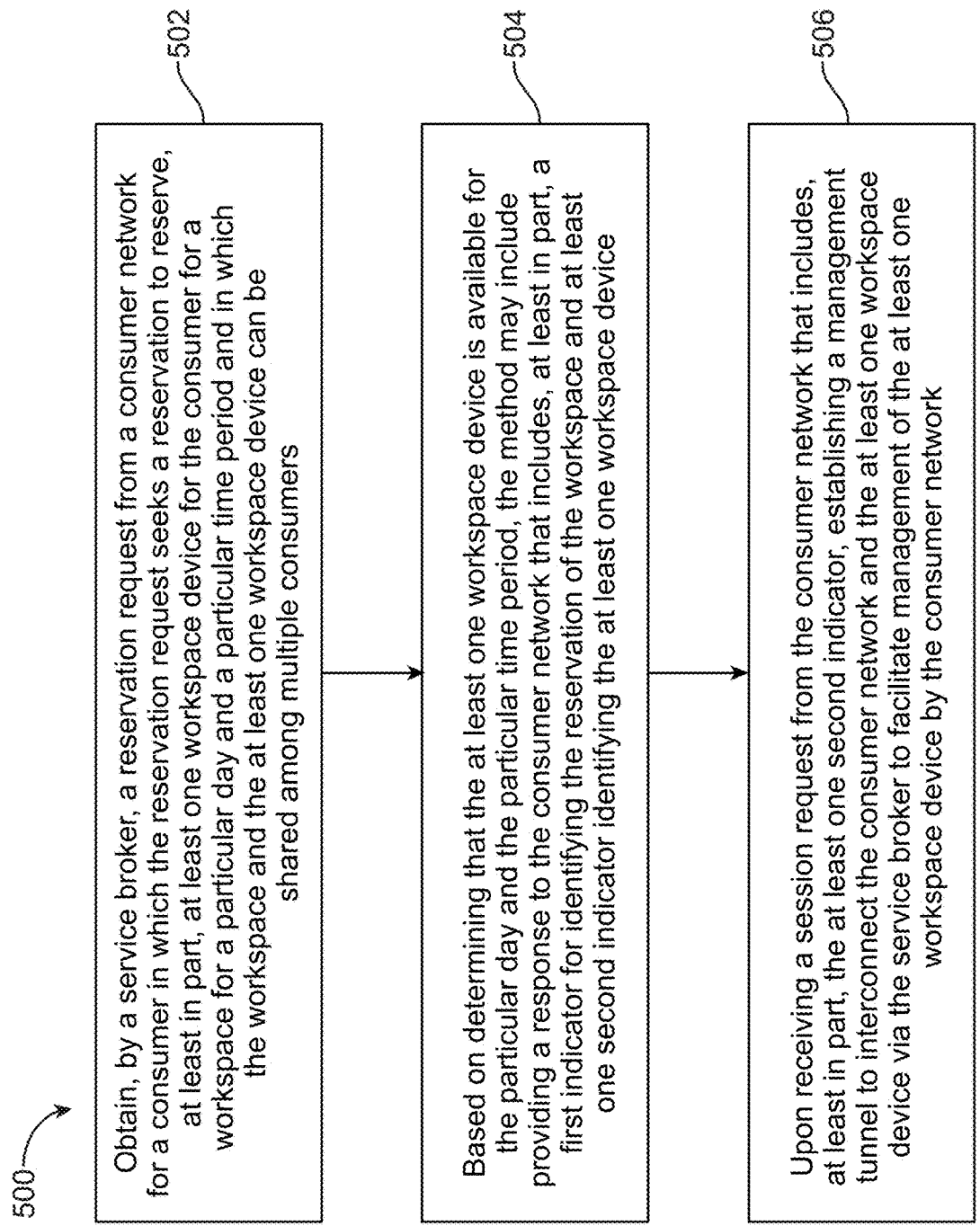
FIG. 5 is a flow chart depicting a method according to an example embodiment.

Referring to FIG. 5, FIG. 5 is a flow chart depicting a method 500 according to an example embodiment. In at least one embodiment, method 500 illustrates example operations that may be performed by a service broker, such as service broker 130-1 or service broker 130' for establishing secure management tunnels to interconnect consumer network device(s) and workspace device(s) for infrastructure and policy orchestration for shared workspace network environments, according to an example embodiment.

At 502, the method may include obtaining, by a service broker, a reservation request from a consumer network for a consumer in which the reservation request seeks a reservation to reserve, at least in part, at least one workspace device for the consumer for a workspace for a particular day and a particular time period and in which the workspace and the at least one workspace device can be shared among multiple consumers.

At 504, based on determining that the at least one workspace device is available for the particular day and the particular time period, the method may include providing a response to the consumer network that includes, at least in part, a first indicator for identifying the reservation of the workspace and at least one second indicator identifying the at least one workspace device. The first indicator may be any indicator identifying the workspace for a particular workspace premises associated with a particular workspace provider network (e.g., 'Room=Room1.providernetwork120-1.rental'). The at least one second indicator may be any indicator that may uniquely identify a network resource reserved for a particular workspace for a particular workspace premises associated with a particular workspace provider network (e.g., AP-Info, Collab-Info, etc.).

At 506, the method may include, upon receiving a session request from the consumer network that includes the at least one second indicator, establishing a management tunnel to interconnect the consumer network and the at least one workspace device via the service broker to facilitate management of the at least one workspace device by the consumer network.

Figure 6:
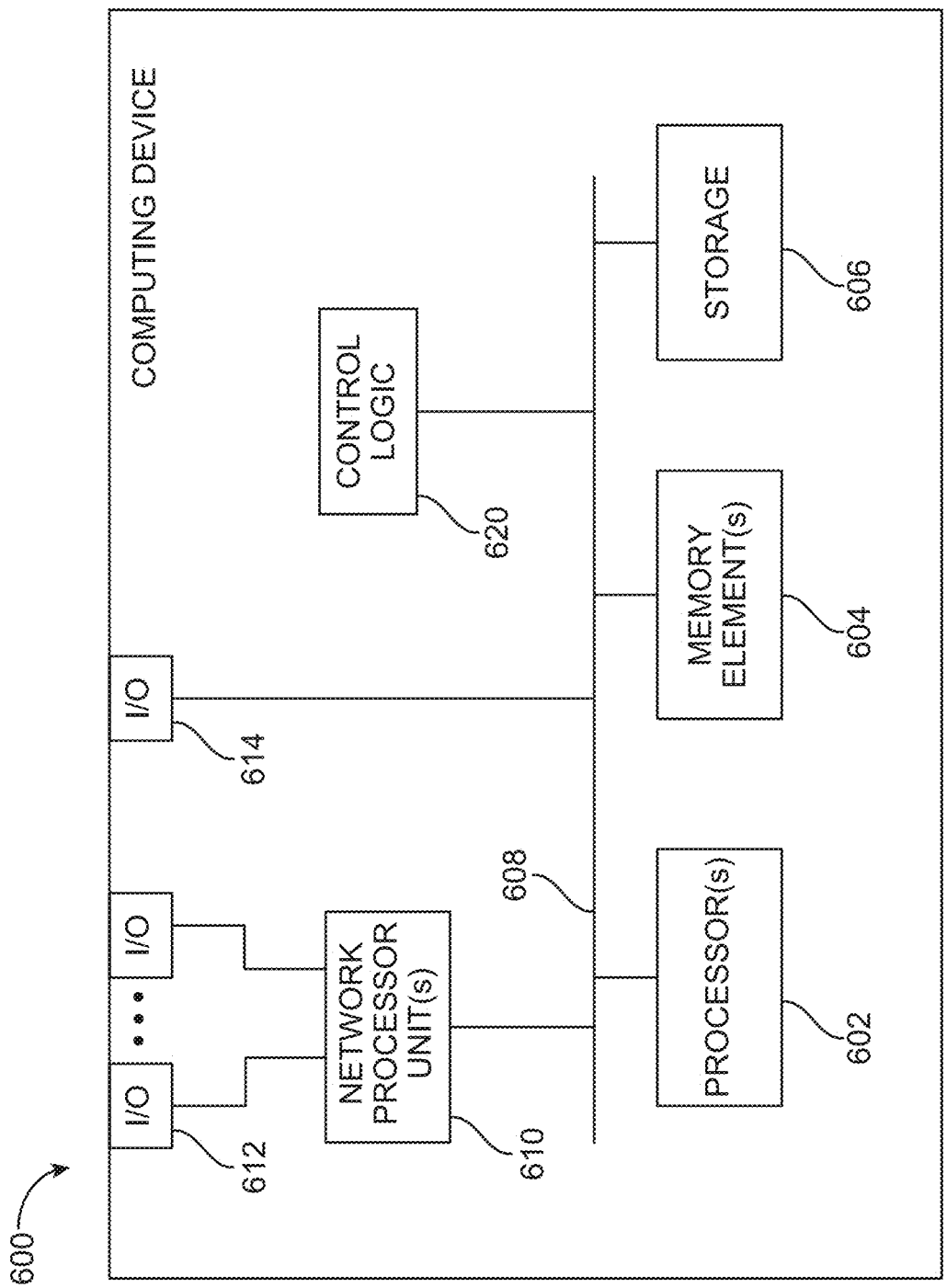
FIG. 6 is a hardware block diagram of a computing device that may perform functions associated with any combination of operations, in connection with the techniques discussed herein.

Referring to FIG. 6, FIG. 6 illustrates a hardware block diagram of a computing device 600 that may perform functions associated with operations discussed herein. In various embodiments, a computing device or apparatus, such as computing device 600 or any combination of computing devices 600, may be configured as any entity/entities as discussed herein in order to perform operations of the various techniques discussed herein, such as, for example, any of service broker 130-1, service broker 130', service broker 130A, service broker 130B, orchestration server 112, a WLC, a provisioning server, a collaboration server, a call manager, and/or any other network element/device/etc. discussed for embodiments herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., hardware processor(s)) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communications (wired and/or wireless) between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) and/or antennas/antenna arrays now known or hereafter developed. Thus, the network processor unit(s) 610 and/or network I/O interface(s) 612 may include suitable interfaces for receiving, transmitting, and/or otherwise communicating (in a wired and/or wireless manner) data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620 of computing device 600) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 604 of computing device 600) and/or storage (e.g., storage 606 of computing device 600) can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a service broker, a reservation request from a consumer network for a consumer, wherein the reservation request seeks a reservation to reserve, at least in part, at least one workspace device for the consumer for a workspace for a particular day and a particular time period, wherein the workspace and the at least one workspace device can be shared among multiple consumers; based on determining that the at least one workspace device is available for the particular day and the particular time period, providing a response to the consumer network that includes, at least in part, a first indicator for identifying the reservation of the workspace and at least one second indicator identifying the at least one workspace device; and upon receiving a session request from the consumer network that includes, at least in part, the at least one second indicator, establishing a management tunnel to interconnect the consumer network and the at least one workspace device via the service broker to facilitate management of the at least one workspace device by the consumer network.

In one instance, the at least one workspace device is a wireless local area network access point and the management tunnel is established to interconnect the wireless local area network access point and a wireless controller of the consumer network. In one instance, the wireless local area network access point is shared among multiple consumers for the particular day and the particular time period. In one instance, the management tunnel enables the wireless controller of the consumer network to provision policies of the consumer for the at least one workspace device.

In one instance, the response further includes a third indicator identifying another workspace device reserved for the workspace and the session request further includes the third indicator. In one instance, the third indicator identifies a collaboration device reserved for the workspace. In one instance, the method may further include establishing another management tunnel to interconnect a collaboration server of the consumer network and the collaboration device.

In one instance, the reservation request further comprises one or more services that are to be utilized by the consumer during the particular day and the particular time period. In one instance, the method may further include, upon expiration of the particular time period, removing the management tunnel to interconnect the consumer network and the at least one workspace device.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a service broker via an orchestration server, a reservation request from an enterprise network of an enterprise, wherein the reservation request comprises an authentication credential generated by the orchestration server in which the reservation request seeks a reservation to reserve, at least in part, at least one workspace device for the enterprise for a physical workspace located at a workspace premise for a particular day and a particular time period, wherein the at least one workspace device is provided via a workspace provider network, the workspace premise and the workspace provider network are capable of being shared among multiple different users or user devices for different enterprises, and the enterprise network is separate from the workspace provider network;
    based on determining that the at least one workspace device is available for the particular day and the particular time period, providing, by the service broker, a response to the enterprise network that includes, at least in part, a first indicator for identifying the reservation of the physical workspace, at least one second indicator identifying the at least one workspace device of the workspace provider network, and the authentication credential; and
    upon receiving, by the service broker at a start time of the particular time period for the particular day, a session request from the enterprise network that includes, at least in part, the authentication credential and the at least one second indicator of the at least one workspace device of the workspace provider network, establishing, via the service broker, a management tunnel between the enterprise network and the workspace provider network to interconnect at least one controller or server device of the enterprise network and the at least one workspace device of the workspace provider network via the service broker to facilitate management of the at least one workspace device of the workspace provider network by the at least one controller or server device of the enterprise network, wherein the management tunnel enables the at least one controller or server device of the enterprise network to provision policies of the enterprise for the at least one workspace device of the workspace provider network.

2. The method of claim 1, wherein the at least one workspace device of the workspace provider network is a wireless local area network access point of the workspace provider network and the at least one controller or server device of the enterprise network is a wireless controller of the enterprise network and the management tunnel is established to interconnect the wireless local area network access point of the workspace provider network and the wireless controller of the enterprise network.

3. The method of claim 2, wherein the wireless local area network access point of the workspace provider network is shared among multiple enterprises for the particular day and the particular time period.

4. The method of claim 2, wherein the management tunnel enables the wireless controller of the enterprise network to provision the policies of the enterprise for the wireless local area network access point of the workspace provider network.

5. The method of claim 1, wherein the response further includes a third indicator identifying another workspace device of the workspace provider network that is reserved for the physical workspace and the session request further includes the third indicator.

6. The method of claim 5, wherein the third indicator identifies that the another workspace device of the workspace provider network is a collaboration device of the workspace provider network that is reserved for the physical workspace.

7. The method of claim 6, further comprising:
    establishing another management tunnel to interconnect a collaboration server of the enterprise network and the collaboration device of the workspace provider network.

8. The method of claim 1, wherein the reservation request further comprises one or more services that are to be utilized by the enterprise during the particular day and the particular time period.

9. The method of claim 1, further comprising:
upon expiration of the particular time period, removing the management tunnel to interconnect the at least one controller or server device of the enterprise network and the at least one workspace device of the workspace provider network.

10. The method of claim 1, wherein the service broker is provided within the workspace provider network.

11. The method of claim 1, wherein the at least one second indicator is an indication associated with an Internet Protocol (IP) address of the at least one workspace device of the workspace provider network.

12. One or more non-transitory computer readable storage media encoded with instructions that, when executed by a processor, cause the processor to perform operations, comprising:
obtaining, by a service broker via an orchestration server, a reservation request from an enterprise network of an enterprise, wherein the reservation request comprises an authentication credential generated by the orchestration server in which the reservation request seeks a reservation to reserve, at least in part, at least one workspace device for the enterprise for a physical workspace located at a workspace premise for a particular day and a particular time period, wherein the at least one workspace device is provided via a workspace provider network, the workspace premise and the workspace provider network are capable of being shared among multiple different users or user devices for different enterprises, and the enterprise network is separate from the workspace provider network;
based on determining that the at least one workspace device is available for the particular day and the particular time period, providing, by the service broker, a response to the enterprise network that includes, at least in part, a first indicator for identifying the reservation of the physical workspace, at least one second indicator identifying the at least one workspace device of the workspace provider network, and the authentication credential; and
upon receiving, by the service broker at a start time of the particular time period for the particular day, a session request from the enterprise network that includes, at least in part, the authentication credential and the at least one second indicator of the at least one workspace device of the workspace provider network, establishing, via the service broker, a management tunnel between the enterprise network and the workspace provider network to interconnect at least one controller or server device of the enterprise network and the at least one workspace device of the workspace provider network via the service broker to facilitate management of the at least one workspace device of the workspace provider network by the at least one controller or server device of the enterprise network, wherein the management tunnel enables the at least one controller or server device of the enterprise network to provision policies of the enterprise for the at least one workspace device of the workspace provider network.

13. The media of claim 12, wherein the at least one workspace device of the workspace provider network is a wireless local area network access point of the enterprise network and the at least one controller or server device of the enterprise network is a wireless controller of the enterprise network and the management tunnel is established to interconnect the wireless local area network access point of the workspace provider network and the wireless controller of the enterprise network.

14. The media of claim 13, wherein the management tunnel enables the wireless controller of the enterprise network to provision the policies of the enterprise for the wireless local area network access point.

15. The media of claim 12, wherein the response further includes a third indicator identifying another workspace device of the workspace provider network that is reserved for the workspace and the session request further includes the third indicator.

16. A service broker comprising:
at least one memory element for storing data; and
at least one processor for executing instructions associated with the data, wherein executing the instructions causes the service broker to perform operations, comprising:
obtaining, by the service broker via an orchestration server, a reservation request from an enterprise network of an enterprise, wherein the reservation request comprises an authentication credential generated by the orchestration server in which the reservation request seeks a reservation to reserve, at least in part, at least one workspace device for the enterprise for a physical workspace located at a workspace premise for a particular day and a particular time period, wherein the at least one workspace device is provided via a workspace provider network, the workspace premise and the workspace provider network are capable of being shared among multiple different users or user devices for different enterprises, and the enterprise network is separate from the workspace provider network;
based on determining that the at least one workspace device is available for the particular day and the particular time period, providing, by the service broker, a response to the enterprise network that includes, at least in part, a first indicator for identifying the reservation of the physical workspace, at least one second indicator identifying the at least one workspace device of the workspace provider network, and the authentication credential; and
upon receiving, by the service broker at a start time of the particular time period for the particular day, a session request from the enterprise network that includes, at least in part, the authentication credential and the at least one second indicator of the at least one workspace device of the workspace provider network, establishing, via the service broker, a management tunnel between the enterprise network and the workspace provider network to interconnect at least one controller or server device of the enterprise network and the at least one workspace device of the workspace provider network via the service broker to facilitate management of the at least one workspace device of the workspace provider network by the at least one controller or server device of the enterprise network, wherein the management tunnel enables the at least one controller or server device of the enterprise network to provision policies of the enterprise for the at least one workspace device of the workspace provider network.

17. The service broker of claim 16, wherein the at least one workspace device of the workspace provider network is a wireless local area network access point of the workspace provider network and the at least one controller or server device of the enterprise network is a wireless controller of the enterprise network and the management tunnel is established to interconnect the wireless local area network access point of the workspace provider network and the wireless controller of the enterprise network.

18. The service broker of claim 17, wherein the management tunnel enables the wireless controller of the enterprise network to provision the policies of the enterprise for the wireless local area network access point of the workspace provider network.

19. The service broker of claim 16, wherein the response further includes a third indicator identifying another workspace device of the workspace provider network that is reserved for the physical workspace and the session request further includes the third indicator.

20. The service broker of claim 19, wherein the third indicator identifies that the another workspace device of the workspace provider network is a collaboration device of the workspace provider network that is reserved for the physical workspace.

\* \* \* \* \*